United States Patent [19]

Pomerleau

[11] Patent Number: 5,675,489
[45] Date of Patent: Oct. 7, 1997

[54] SYSTEM AND METHOD FOR ESTIMATING LATERAL POSITION

[75] Inventor: Dean A. Pomerleau, Wexford, Pa.

[73] Assignee: Carnegie Mellon University, Pittsburgh, Pa.

[21] Appl. No.: 498,593

[22] Filed: Jul. 6, 1995

[51] Int. Cl.⁶ ..................................................... G05D 1/00
[52] U.S. Cl. ....................................................... 364/424.033
[58] Field of Search ................... 364/424.033, 424.027, 364/424.028, 424.029, 424.031, 424.032, 426.041, 426.044, 426.046, 461, 559, 578; 382/107, 113, 123, 154, 153, 190, 193, 194, 203, 316

[56] References Cited

U.S. PATENT DOCUMENTS

| | | | |
|---|---|---|---|
| 5,101,351 | 3/1992 | Hattori | 364/424.02 |
| 5,233,527 | 8/1993 | Shimosuke | 364/424.02 |
| 5,245,422 | 9/1993 | Borcherts et al. | 358/103 |
| 5,301,115 | 4/1994 | Nouso | 364/460 |
| 5,341,437 | 8/1994 | Nakayama | 382/1 |
| 5,359,666 | 10/1994 | Nakayama et al. | 382/1 |
| 5,414,625 | 5/1995 | Hattori | 364/424.02 |
| 5,430,810 | 7/1995 | Saeki | 382/281 |
| 5,448,487 | 9/1995 | Arai | 364/449 |
| 5,586,063 | 12/1996 | Hardin et al. | 364/561 |

OTHER PUBLICATIONS

Todd M. Jochem & Shumeet Baluja, Massively Parallel, Adaptive, Color Image Processing for Autonomous Road Following, in Massively Parallel Artificial Intelligence, 281, 282–85, 297–303 (Hiroak Kitano & James Hendler eds., AAAI Press, Menlo Park, California, 1994).

E.D. Dickmanns & A. Zapp, A Curvature–based Scheme for Improving Road Vehicle Guidance by Computer Vision, in Proceedings of the Advances in Intelligent Robotics Systems, SPIE's Cambridge Symposium on Optical and Optoelectronic Engineering, Cambridge, Massachusetts, 1986.

Marilyn Nashman and Henry Schneiderman, Real–Time Visual Processing for Autonomous Driving, in Proceedings of Intellegent Vehicles Symposium, Tokyo, 1993.

Charles E. Thorpe, Outdoor Visual Navigation for Autonomous Robots, in Proceedings of the Intelligent Autonomous Systems, Amsterdam, 1989.

Jinyou Zhang and Hans–Hellmut Nagel, Texture Analysis and Model–Based Road Recognition for Autonomous Driving, hhn @ iitb.fhg.de, Aug. 18, 1994.

Primary Examiner—Kevin J. Teska
Assistant Examiner—Stephen J. Walder, Jr.
Attorney, Agent, or Firm—Kirkpatrick & Lockhart LLP

[57] ABSTRACT

A system for estimating lateral offset of a vehicle from a centered position on a road is comprised of a video camera and a digitizer to produce digitized input signals representative of the road ahead of the vehicle. A circuit is provided for sampling the digitized input signal to create a perspective-free image comprised of rows and columns of pixels. The curvature of the road is determined by ascertaining an amount by which each row of pixels of the perspective-free image must be horizontally shifted to cause features to appear in the perspective-free image as a straight line. Each column of pixels of the perspective-free image is added to produce a single row, referred to as a current scanline profile, representative of the vehicle's position on the road. The current scanline profile is compared with a template profile representative of the vehicle's position when properly centered on a straight road to determine an amount by which the current scanline profile must be shifted to arrive at an optimal correlation with the template profile. The amount that the current scanline profile must be shifted is representative of the lateral offset of the vehicle from the center of the road. Circuitry is responsive to the lateral offset and the curvature of the road to produce an appropriate output signal.

31 Claims, 11 Drawing Sheets

Original Image

FIG. 8 — Smooth Transitions Between Columns

FIG. 9 — Abrupt Transitions Between Columns

SYSTEM AND METHOD FOR ESTIMATING LATERAL POSITION

BACKGROUND OF THE INVENTION

1. Field of the Invention

The present invention is directed broadly to the field of visual processing and, more particularly, to the processing of visual information for estimating a vehicle's lateral position on a road and the road's curvature.

2. Description of the Background

Much attention has been paid in recent years to the development of intelligent vehicles. The development of a truly intelligent vehicle has been hampered by the lack of a vision system capable of following the road. That is because, in general, road scenes vary over a wide range of appearances. Roads typically have cracks, potholes, varying degrees of illumination including shadows and glare, obstructions such as other vehicles, rain, snow, dirt, or other foreign matter which can cause a vision system to become disoriented. Although the ability of vision systems to follow a road which is well marked with lane markers has been demonstrated, where such lane markers are not available, the ability of vision systems to follow a road is severely challenged.

Research into developing a vision system for intelligent vehicles has led to the implementation of a variety of methods. Such methods include statistical classification, feature tracking, and neural network based methods. Statistical classification methods involve the classification of each pixel in an image to determine if the pixel represents a "road" or "non-road" portion of the image. The region containing the highest concentration of pixels designated as "road" thus provides an indication of the curvature of the road. Such systems are typically not sufficiently robust because of the large variety of road surfaces and surface conditions.

The feature tracking methods typically require markers or some other distinguishing feature which can be tracked. Accordingly, such methods are also not sufficiently robust in that when the feature being tracked is no longer available, the system becomes disoriented.

Carnegie Mellon University has done a substantial amount of work using a neural network based method. CMU's ALVINN system learns to locate the road using whatever features are available on the current road. Such features could include lane markers, the road edges, oil spots down the center of the lane, or even ruts in the snow left by previous vehicles. The ALVINN system's ability to learn to find the road using whatever features are available gives it a distinct advantage over both statistical classification methods and feature tracking methods. However, the ALVINN system typically needs to be retrained when the road changes appearance. Currently, such retraining is fast by neural network standards, typically around two minutes. However, such a retraining period is too long when a vehicle is moving at 55 miles per hour (88.5 Kmph).

Thus, the need exists for an apparatus and method of processing visual information in a fast and efficient manner and which are sufficiently robust so as to provide a high degree of confidence that the system will function without regard to how poorly the road may be defined.

SUMMARY OF THE INVENTION

A system and method for estimating a vehicle's lateral displacement on a road constructed according to the teachings of the present invention is comprised of a video camera and a digitizer, as needed, to produce digitized input signals representative of the road ahead of the vehicle. A circuit is provided for sampling the digitized input signal to create a perspective-free image. The perspective-free image is typically of a lower resolution than the original digitized input signals. The perspective-free image may take the form of a matrix comprised of rows and columns of pixels.

Circuitry is provided for determining the curvature of the road. The curvature of the road is determined by ascertaining an amount by which each row of pixels of the perspective-free image must be horizontally shifted to cause features to appear in the perspective-free image as a straight line. The circuitry for determining the curvature of the road adds each column of pixels of the perspective-free image to generate a current scanline profile representative of the vehicle's position on the road.

A memory device is provided for storing at least one template profile representative of the vehicle being properly centered on a straight road. Circuitry is provided for comparing the current scanline profile with the template profile to determine an amount by which the current scanline profile must be shifted to arrive at the best correlation with the template profile. The amount that the current scanline profile must be shifted is representative of the lateral offset of the vehicle from the center of the road. Circuitry, responsive to the lateral offset and the curvature of the road, produces an appropriate output signal.

The present invention is also directed to a method of carrying out the functions described herein in connection with the apparatus of the present invention. The preferred implementation of the present invention is to implement the functions of the described circuits through an appropriately programmed digital computer.

According to the preferred embodiment, the stored template profile is allowed to evolve over time so that it usually provides a high degree of correlation with the current scanline profile. In the preferred embodiment, means are provided for changing the template profile in the event that there is no longer a high degree of correlation between the current scanline profile and the template profile.

According to another embodiment of the present invention, the output signal may take the form of an audio signal warning the driver that the vehicle is no longer properly centered in the road. According to another embodiment of the present invention, the output signal may take the form of tactile feedback. Such tactile feedback may include causing the steering wheel to mildly vibrate, or making it more difficult to turn the steering wheel in a direction which would cause the vehicle to move even further away from a centered position. In yet another embodiment of the present invention, the output signal could take the form of a control signal which begins to steer the vehicle in the direction needed to return the vehicle to a center position. In yet another embodiment of the present invention, the output signal could take the form of a control signal which could take control of the steering wheel long enough to recenter the vehicle. In another embodiment of the present invention, it is anticipated that the output signal would be used to control steering of the vehicle such that the vehicle would be autonomously guided.

The system and method of the present invention are similar to neural networks in performance in that each can utilize whatever features are available to find the road. No distinct lane markers are required. However, unlike neural network based systems, the present system does not require an extended training period. The present invention can rapidly adapt to changes in the road's appearance that occur frequently in the real world when the pavement material, number of lanes, lane marking configurations, lighting conditions, or road surface conditions change. The present invention requires no more computational resources than are required by prior art neural network based systems. Further, because of its algorithmic structure, the present invention should be easier to implement on a single chip than neural network based systems. Those, and other advantages and benefits of the present invention will become apparent from the Detailed Description of the Preferred Embodiments hereinbelow.

BRIEF DESCRIPTION OF THE DRAWINGS

For the present invention to be clearly understood and readily practiced, the present invention will be described in conjunction with the following figures wherein.

DETAILED DESCRIPTION OF THE PREFERRED EMBODIMENTS

Figure 1:
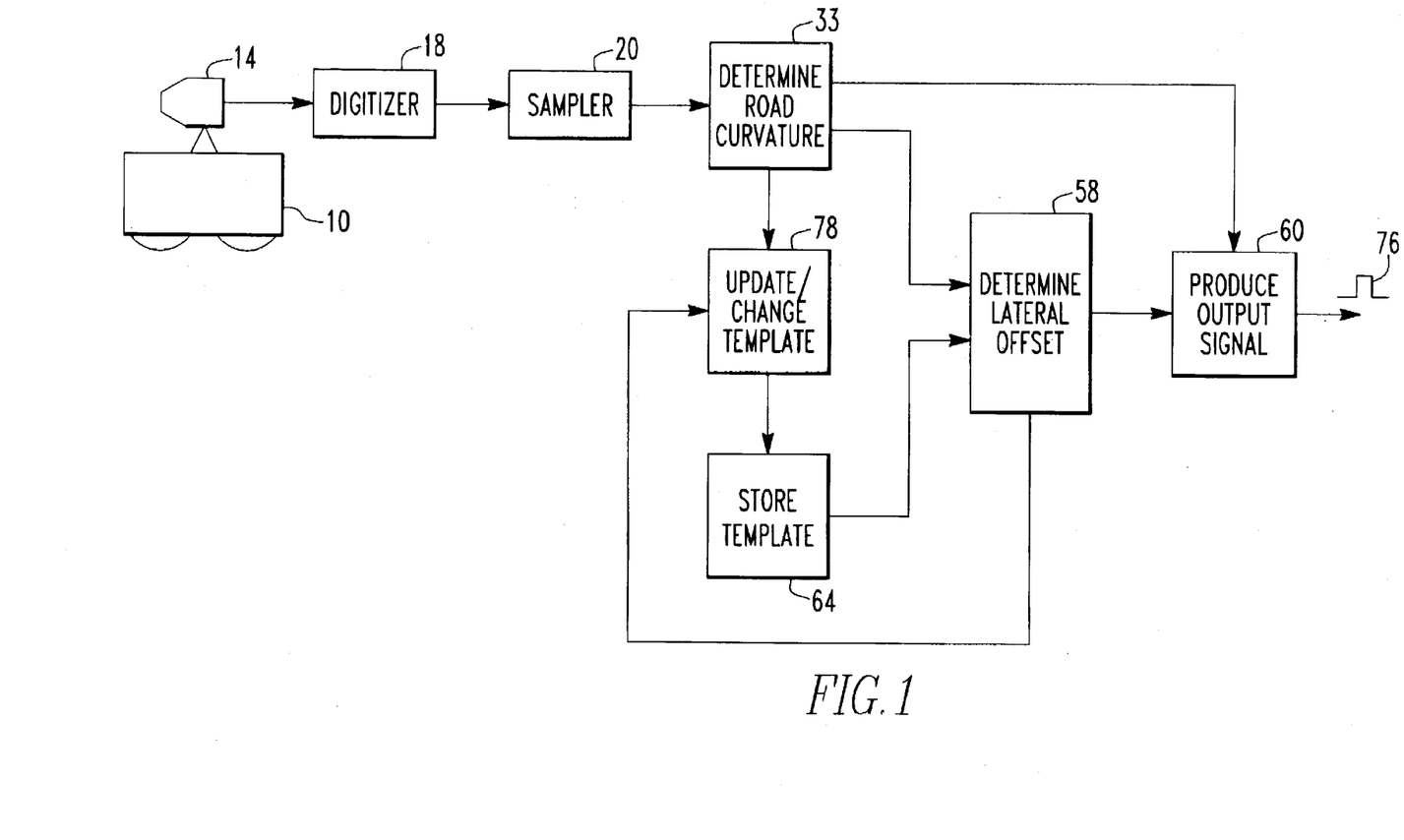
FIG. 1 is a high level block diagram illustrating a vehicle carrying a system constructed according to the teachings of the present invention.

FIG. 1 is a high level block diagram illustrating a vehicle 10 carrying a system 12 constructed according to the teachings of the present invention. The vehicle 10 may be any type of vehicle or a robot. The system 12 is comprised of a forward looking video camera 14 which produces a high resolution image 15, illustrated in FIG. 2, of the road or terrain in front of the vehicle or robot. The term road is used herein in its broadest sense, and may include paths, trails, and the like. The high resolution image 15 may be constructed of a matrix of pixels comprised of, for example, 640 columns×480 rows.

Figure 2:
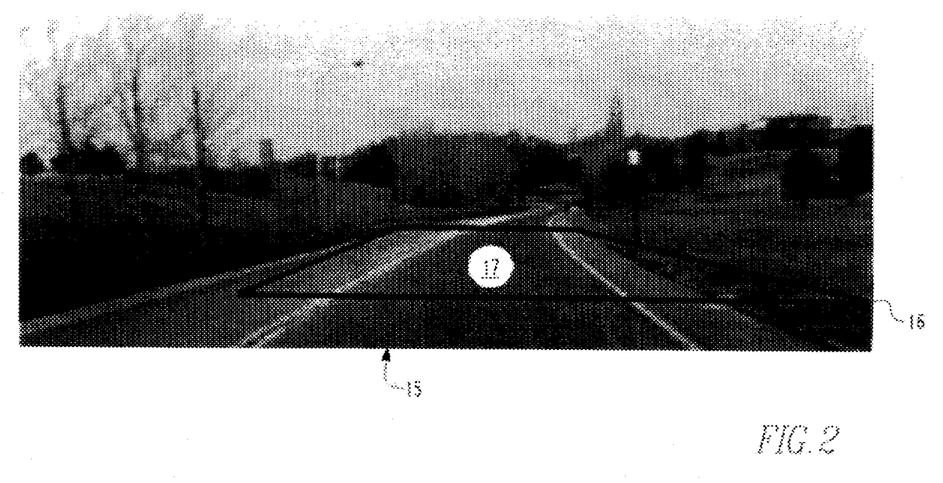
FIG. 2 illustrates a high resolution image taken by a forward looking video camera, a window of interest is that portion of the high resolution image appearing within a trapezoid superimposed on the high resolution image.

Superimposed on the high resolution image 15 illustrated in FIG. 2 is a trapezoid 16. The portion of the high resolution image 15 falling within trapezoid 16 represents a window of interest 17. The window of interest 17 may be, for example, 300 pixels across the proximal edge at its widest point as seen in FIG. 2 and 100 pixels across the distal edge at its widest point as seen in FIG. 2. The high resolution image 15 is digitized by a digitizer 18 and a digitized high resolution image is input to a sampler 20.

It is the sampler 20 which determines the area of interest 17. Thus, the first function of the sampler 20 is to extract the window of interest 17 from the high resolution image 15.

Two factors should be kept in mind in determining the size and shape of the window of interest 17. For vehicles traveling slowly, the window of interest 17 may be centered on the terrain or road immediately in front of the vehicle. As the vehicle begins to travel more quickly, the window of interest must progressively move forward of the vehicle, i.e., look further down the road. That is because as the vehicle travels faster, it is necessary to have time to react to changes in the curvature of the road. In the preferred embodiment, the distal edge of the window of interest 17 is located so as to image the road at a distance ahead of the vehicle equal to the distance the vehicle will travel in 2.5 seconds. At 60 mph (96.5 Kmph), that corresponds to 220 ft. (67 m). At low speeds, the distal edge of the window of interest is limited to be no closer to the vehicle than 65 ft. (19.8 m).

Figure 3:
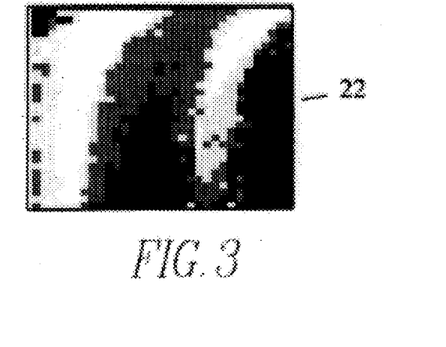
FIG. 3 illustrates a perspective free image corresponding to the high resolution image appearing within the window of interest in FIG. 2.

The second factor is the shape of the trapezoid, which is dependant upon the angle of the camera 14. As will be described in detail later, the second function of the sampler 20 is to produce a perspective-free image 22 which is illustrated in FIG. 3. To produce the perspective-free image 22, it is necessary that the width of the proximal portion of the window of interest 17 represent the same width in the real world as the distal width of the trapezoid 16. Referring to FIG. 2, if the proximal edge of the trapezoid represents twelve feet (3.7 m) in the real world, then the distal width of the trapezoid must be sized so that it also represents twelve feet (3.7 m). Of course, because of the effect of perspective, the representation of twelve feet (3.7 m) at the distal edge of the trapezoid 16 results in an edge substantially shorter than the proximal edge. As the camera angle changes, and the camera 14 is looking further and further down the road, the effects of perspective are greater such that the disparity between the length of the proximal edge and the length of the distal edge of the trapezoid 16 becomes greater. As the camera focuses closer and closer toward the front of the vehicle, the effects of perspective become less and less, such that the length of the distal edge of the trapezoid and the length of the proximal edge of the trapezoid become more similar.

The second function of the sampler 20 is to transform the window of interest 17 into the perspective-free image 22 shown in FIG. 3. The perspective-free image 22 is typically a low resolution image comprised of, for example, 32 columns of pixels ×30 rows of pixels. The manner in which the second function of the sampler 20 is carried out is illustrated in detail in conjunction with FIGS. 4a, 4b, and 4c.

Figure 4A:
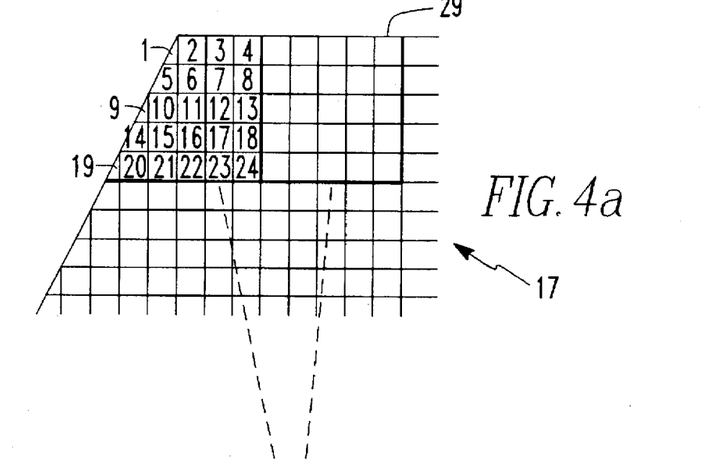
FIGS. 4a, 4b, and 4c illustrate how the high resolution image of FIG. 2 within the window of interest may be sampled to produce the perspective free image of FIG. 3.
Figure 4B:
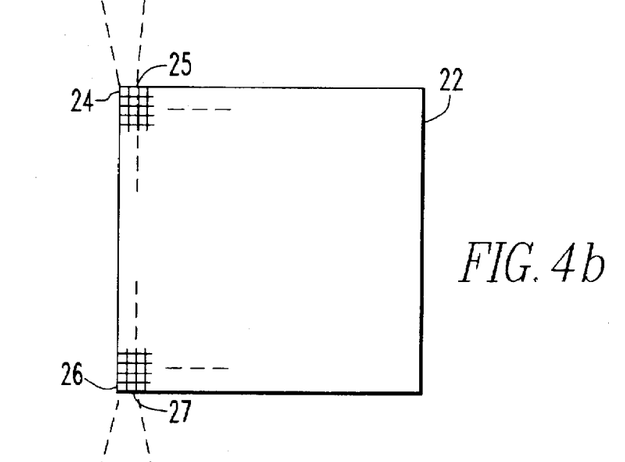
Figure 4C:
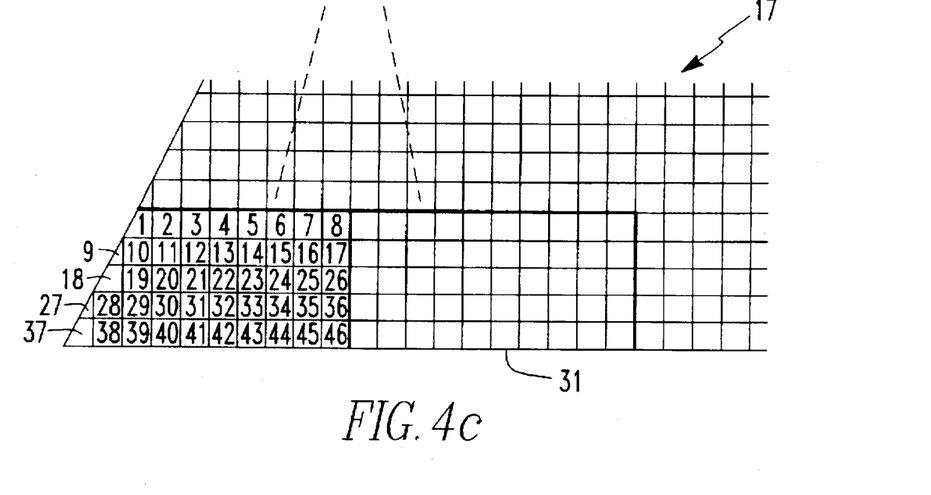

FIG. 4a illustrates the upper left hand corner of the area of interest 17 while FIG. 4c illustrates the lower left hand corner of the area of interest 17. In FIG. 4a, the pixels numbered 1-24 are added together and averaged to provide the value for a single pixel, pixel 24, in the perspective-free image 22. To save computational time, it is possible to subsample a small percentage of the pixels, e.g., five out of the 24, and average just those pixels. An adjacent block 29 of twenty-five pixels illustrated in FIG. 4a is added together and averaged to provide a value for the pixel 25 in FIG. 4b. In that manner, the distal five rows of pixels making up the high resolution image 15 are used by sampler 20 to produce a single, top row of pixels in the image 22 in FIG. 4b. Thereafter, the sampler works through the high resolution window of interest 17 averaging together groups of pixels having a common height but a width that varies from row to row because of the increasing width of the trapezoidal window of interest 17 when moving from the distal to the proximal edge.

The bottom left corner of the window of interest 17 is illustrated in FIG. 4c. The 46 pixels in the bottom left corner are added together and averaged to provide the value for the lower left pixel 26 in the image 22. An adjacent block 31 of fifty pixels illustrated in FIG. 4C is added together and averaged to provide a value for a pixel 27 which is in the bottom row, second column, of the image 22. In that manner, the high resolution window of interest 17 is sampled and transformed into the low resolution image 22.

In one embodiment, raw intensity pixels from a black and white camera may be averaged to create the perspective free image from the high resolution image. In another embodiment, contrast enhanced pixels derived from either a color or black and white images using one or more contrast enhancement techniques well known in the literature may be employed to generate the perspective free image from the high resolution image. See, Pomerleau, D. A. (1993) Neural network perception for mobile robot guidance, Kluwer Academic Publishing, Boston Mass., which is hereby incorporated by reference. Images from other sensors, such as an infrared camera, either with or without contrast enhancement, may also be employed as the input source for the present invention.

As a result of the transformation, the effect of perspective is eliminated. As seen in FIG. 2, the center line of the road and the edge line of the road, because of the effects of perspective, appear to intersect at some point in the distance. However, the center line of the road and the edge line of the road as seen in FIG. 3 are now essentially parallel. The low resolution, perspective-free image 22 is input to a circuit 33 illustrated in FIG. 1 which determines the curvature of the road.

It is anticipated that the function of the camera 14, digitizer 18, and the first and second functions of the sampler 20 may be integrated into a single device fitted with appropriate lenses and electronics such that the output of that device is a digitized version of the perspective free image 22.

Figure 5:
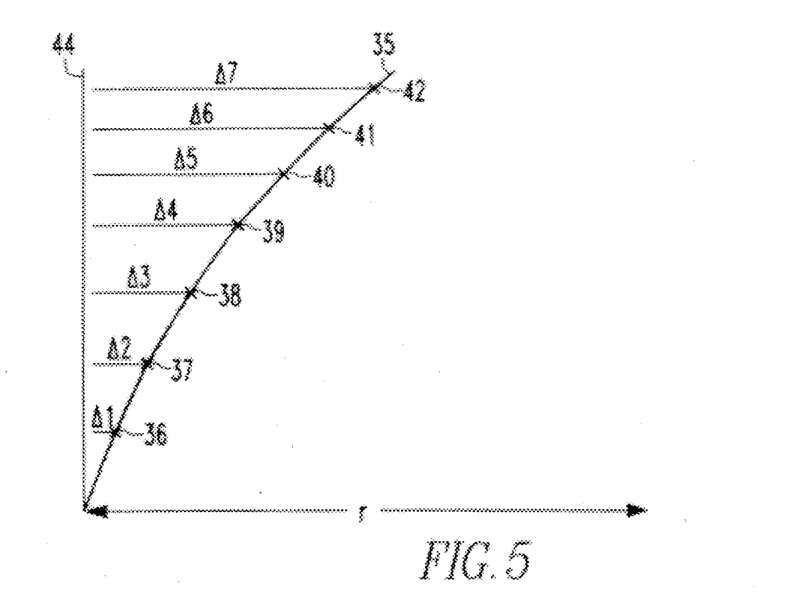
FIG. 5 illustrates the amount each row of pixels in the perspective free image must be shifted to straighten out the features in the perspective free image.

FIG. 5 illustrates how each row of pixels in the image 22 must be horizontally shifted to straighten out the features in the image 22. For example, assume that a line 35 appearing in FIG. 5 represents the center line of the road. If the value of the radius of curvature r is known, then the amount Δ1 by which a pixel 36 must be shifted to move pixel 36 to a point on a vertical line 44 tangent to a circle of radius r is known. Similarly, by knowing the radius r, the amounts Δ2, Δ3, Δ4, Δ5, Δ6, and Δ7 by which pixels 37-42, respectively, must be shifted, is known. The curvature of the road is the inverse of the radius. It is, therefore, one function of circuit 33 to determine the curvature of the road. Another function of circuit 33 is to provide a current scanline profile which results from summing up each column in the low resolution, perspective-free image 22 in which the rows of pixels have been shifted to cause the features to appear as straight vertical lines. It is important to note that the features which the system and method of the present invention utilize need not be line or lane markers. Any feature, such as a rut in the road, oil droppings along the center of a lane, the edge of a road, tire tracks in the snow, tire tracks in mud, etc. can be used as the feature or features which the system and method of the present invention attempt to "straighten out". The details of the operation of circuit 33 illustrated in FIG. 1 will now be described in conjunction with FIG. 6 and FIGS. 7a-7j.

Figure 6:
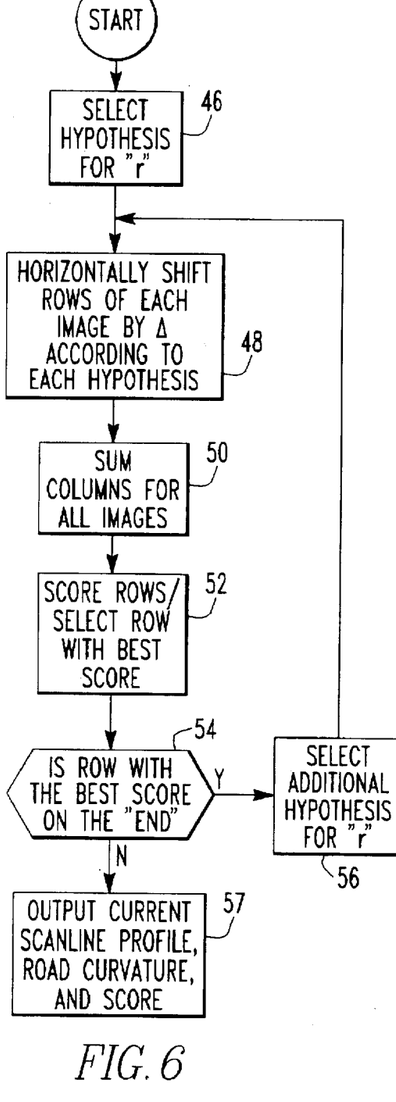
FIG. 6 is a flow chart illustrating the steps for determining the curvature of the road and producing the current scanline profile.

The function of circuit 33 is, in the preferred embodiment, carried out by software. A flow chart illustrating the steps carried out by the software for determining r, and hence the curvature of the road, and the current scanline profile, is set forth in FIG. 6. The first step 46 in FIG. 6 is to hypothesize values for r. One hypothesis for the value for r is typically the value which provided the best result during the last iteration of the software. Assume, for example, that r had a value of 3,000 ft. (914.4 m). Accordingly, one value selected for r at step 46 is 3,000 ft. (914.4 m). The software then proceeds to generate hypotheses on each side of 3,000 ft. (914.4 m). That is, hypotheses where r has a value of 2,700 ft. (823.0 m), 2,800 ft. (853.4 m), 2,900 ft. (883.9 m), 3,100 ft. (944.8 m), 3,200 ft. (975.3 m), and 3,300 ft. (1,005.8 m) are generated. In general, the difference in radius between hypotheses is proportional to speed. The faster the vehicle is traveling, the less curry the road, and therefore, the smaller the range of hypotheses that need be tested. The software now has nine hypotheses to evaluate; the hypothesis that worked best last time plus four hypotheses on either side of the hypothesis that worked best last time.

At step 48, the software evaluates each of the nine hypotheses. That is, beginning with nine copies of the low resolution image 22, the process of shifting each row of pixels by some Δ as explained in conjunction with FIG. 5 is carried out for each of the nine values of r.

It is sometimes necessary to shift a row of pixels by fractional amounts (e.g. 0.5 pixels). That is accomplished in the preferred embodiment using a weighted sampling technique, described below, although there are several possible methods for doing this.

First, for illustrative purposes, suppose the system 12 needed to shift the row of 6 pixels below by a whole number amount of pixels (say 1 pixel) to the left.

| 1 | 2 | 3 | 4 | 5 | 6 |

To generate the first pixel value in the new, shifted row, the system samples pixel 2. To generate the second pixel value, the system samples pixel 3. The final shifted row would look like:

| 2 | 3 | 4 | 5 | 6 | ? |

The ? signifies that the value for this pixel is unknown because the system does not have a corresponding pixel to sample in the original row.

Now suppose the system 12 needed to shift the original row by a fractional amount (say 0.5 pixels) to the left. It uses the same technique of sampling the original row, but this time, because the shift it is performing falls between two pixels, it samples two pixels and averages them to generate each pixel in the shifted row. For example, to generate the first pixel in the row that has been shifted 0.5 pixels left, the system samples the first and second pixels in the original row and averages them. Similarly, to generate the second pixel in the shifted row, the system samples the second and third pixels in the original row and averages them.

What the system is doing is linearly interpolating between pixels to estimate what the value would be half way between them. Of course, if a shift other than 0.5 pixels was desired, for instance 0.25 pixels, the system would not weight the two samples from the original row equally as it did in the 0.5 shift case, to compute the new, shifted pixel value. Instead, for example, to compute the value for the first pixel in the shifted row, it would take 0.75 times the value of the first pixel and 0.25 times the value of the second pixel. That is because the point the system is trying to sample falls much closer to the fist pixel than the second, and therefore the first should count more heavily in determining the value for the first pixel in the shifted row.

Using that subpixel interpolation technique, the system can shift rows in the perspective free image by the precise amounts required to "straighten out" the features according to a particular hypothesized radius.

By convention a straight road has an infinite radius (0 curvature), a light right turn would have a large positive radius (e.g. 6,000 ft. (1,828.7 m) on the highway) and a sharp right curve would have a smaller positive radius (e.g. 1,000 ft. (304.8 m)). The sharpest curves you get on highways have about a 900 ft. (274.3 m) radius, and the sharpest curves you get on rural roads have about a 200 ft. (61.0 m) radius. A shallow left curve would have a large negative radius (e.g. −6,000 ft. (−1,828.7 m) on the highway) and a sharp left curve would have a smaller negative radius (e.g. −900 ft. (−274.3 m) on the highway, or −200 ft. (−61.0 m) on a rural road).

Figure 7A:
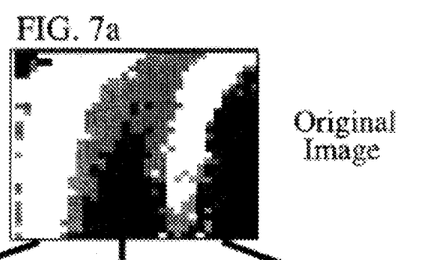
FIG. 7a illustrates an original perspective free image.
Figure 7B:
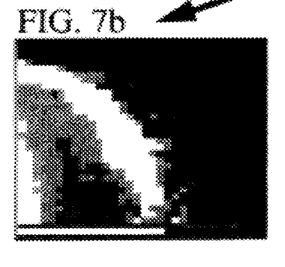
FIGS. 7b through 7j illustrate six perspective free images corresponding to the original perspective free image as modified according to nine different curvature hypotheses.
Figure 7C:
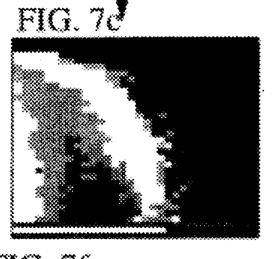
Figure 7D:
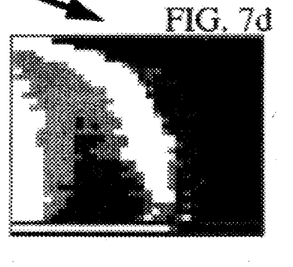
Figure 7E:
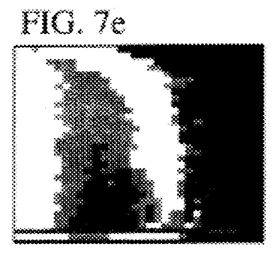
Figure 7F:
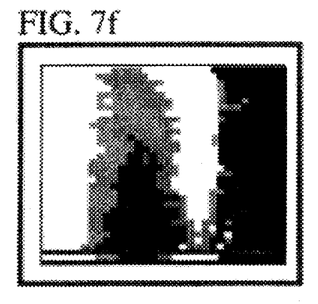
Figure 7G:
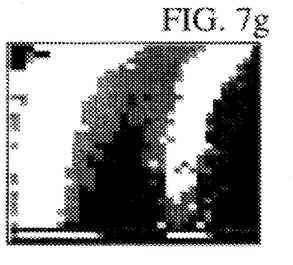
Figure 7H:
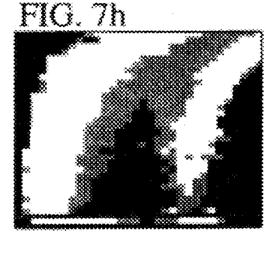
Figure 7I:
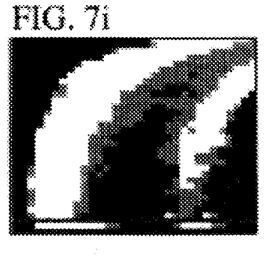
Figure 7J:
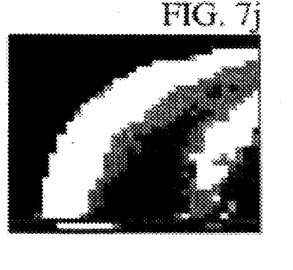

A beginning low resolution image 22 is illustrated in FIG. 7a and the images which result from applying each of nine different hypotheses to the image of FIG. 7a are illustrated in FIGS. 7b–7j. FIG. 7b represents the sharpest right turn hypothesis (a radius of about +300 ft. (91.4 m)); FIG. 7c represents the next sharpest right turn hypothesis (about +500 ft. (152.4 m)); FIG. 7d represents the next sharpest right turn hypothesis (about +800 ft. (243.8 m)); FIG. 7e represents the next sharpest right turn hypothesis (about +1,200 ft. (365.7 m)), FIG. 7f represents the shallowest right turn hypothesis (about +1,700 ft (518.1 m)), FIG. 7g represents the "straight road hypothesis" (infinite radius); FIG. 7f represents the shallowest left turn hypothesis (about −1,700 ft. (−518.1 m)); FIG. 7h represents the shallowest left turn hypothesis (about −1,700 ft (−518.1 m)); FIG. 7i represents the next sharper left turn hypothesis (about −1,200 ft. (−365.7 m)); and FIG. 7j represents the sharpest left turn hypothesis (about −800 ft. (−243.8 m)).

Note that the straight road hypothesis image of FIG. 7g is identical to the original image, FIG. 7a. That is because if that hypothesis were correct, the features in the image should be straight to start with, and therefore shouldn't need shifting to straighten them out. By looking at the image it is obvious that this is not the case, so the straight ahead hypothesis is incorrect.

Reviewing the images illustrated in FIGS. 7b–7j, it is seen that the image 7f, representative of the hypothesis wherein r equals 1,700 ft. (518.1 m), yields the straightest features, i.e, the best results. The image of FIG. 7b, where the hypothesis was r equals 300 ft. (91.4 m), shifted the rows too far to the left. Similarly, the image shown in FIG. 7j resulting from the hypothesis wherein r equals −800 ft. (−243.8 m) resulted in the features not being shifted far enough. The manner in which the software determines which of the images in FIGS. 7b–7j is the best, is carried out in steps 50 and 52 in FIG. 6.

At step 50, the software sums each of the columns for all of the images to provide a single row representative of the entire image. That process is shown graphically in FIGS. 8 and 9. In the upper portion of FIG. 8, the image shown in FIG. 7e is reproduced. Each of the, for example, thirty-two columns of pixels is added vertically to provide a single intensity value. Thus, for the first column, it is seen that a high intensity value, corresponding to most of the pixels being white, is achieved. Similarly, the value resulting from the summation of all of the pixels in column two results in a large value. The process continues until all thirty-two columns have been summed, and the resulting plot of intensity per column number is seen in the bottom portion of FIG. 8. FIG. 9 illustrates the same process being carried out with respect to the image illustrated in FIG. 7f.

Figure 8:
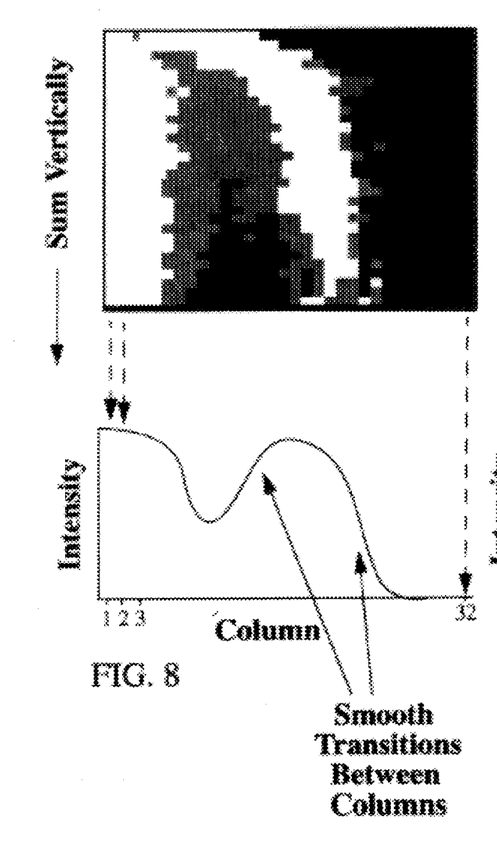
FIGS. 8 and 9 illustrate how the hypotheses of FIGS. 7c and 7f, respectively, are scored.
Figure 9:
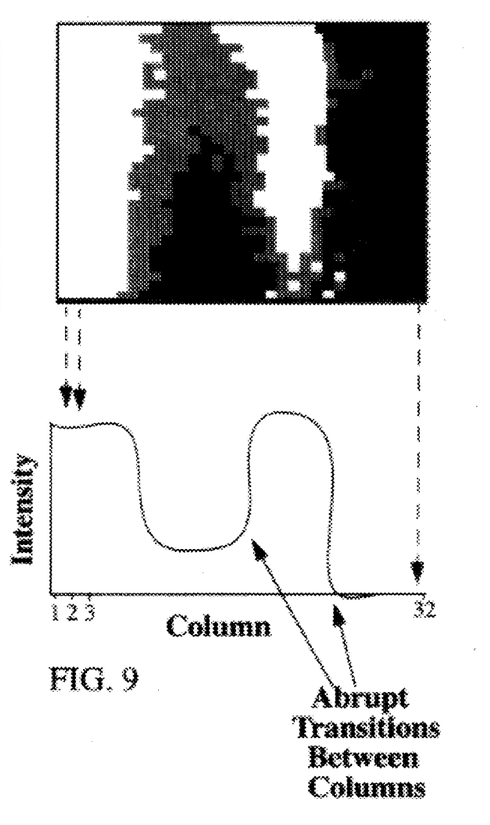

Comparing the intensity versus column graphs of the bottom portion of FIG. 8 with the bottom portion of FIG. 9, it is seen that the image from FIG. 7e results in smooth transitions between columns whereas the image of FIG. 7f results in abrupt transitions between columns. Abrupt transitions between columns indicate that features have been aligned in vertical rows. The "degree of abruptness" of transitions can be calculated by comparing the value for each column with the value for other columns. In the preferred embodiment, the values for adjacent columns are compared. That is, the intensity value for column one is compared with the intensity value for column two and the difference recorded. The intensity value for column two is compared to the intensity value for column three and the difference is recorded. The intensity value for column three is compared to the intensity value for column four and the difference is recorded. That process is carried out for each of the columns in FIG. 8. In the current embodiment of the software, the five largest differences in intensity values are added up to provide a score for the image. That process is carried out for each of the images illustrated in FIGS. 7b–7j. The image with the highest score is the image which represents the most abrupt changes in intensity values from one column to the next. Thus, the row with the highest score is selected as the row with the straightest features.

At step 54, a decision is made to determine if the row having the best score was on the end. That is, a determination is made if the row having the best score was produced by a hypothesis which is at a positive or negative, or numerical, extreme. If that is the case, then additional hypotheses for r are set forth in step 56 and the process repeated to ensure that the true value of r is not greater than the positive or negative extreme. If more values of r must be tested, process flow returns to step 48 and steps 48, 50, and 52 are repeated until the decision block 54 is satisfied. When decision step 54 is satisfied, the row having the highest score is output at step 57 to a circuit 58 in FIG. 1. The intensity versus column graph of the row having the highest score presents a profile representative of the current position of the vehicle with respect to the features being tracked. The row with the highest score is thus referred to as the current scanline profile. Circuit 33 also outputs the curvature of the road, which is the inverse of the successful hypothesis for the value r, to a circuit 60 to be described hereinafter.

Circuit 33 may also output the score for the current scanline profile as shown by step 57. The score may be used as a measure of confidence. If there are no road-type features, the score will be low, and at some point the system may determine that because of the lack of road-type features, the system should not be relied upon.

Figure 10:
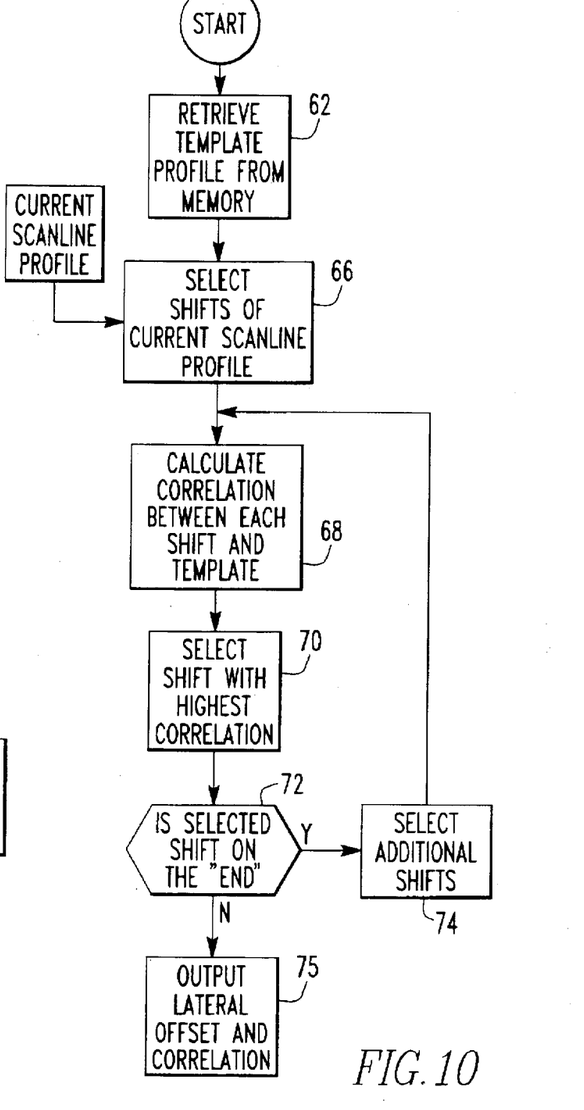
FIG. 10, is a flow chart illustrating the steps for determining lateral offset.

Turning to the circuit 58 illustrated in FIG. 1, the reader should recognize that in the preferred embodiment of the present invention, the functions of circuit 58 are implemented in software. The purpose of circuit 58 is to determine the lateral offset between the current scanline profile representative of the current position of the vehicle with respect to the road and a template profile, stored in a memory device 64, representative of the vehicle's position when properly centered in the road. The software implementing the circuit 58 is illustrated in FIG. 10 and begins at step 62 wherein the template profile is retrieved from the memory device 64. The template profile stored in memory 64 may be created in a number of ways. The simplest way to create a template profile to be stored in memory 64 is to properly center the vehicle on a road and then turn the system 12 on so that the row with the highest score output from block 33 can be used as the template. Another way to produce a template profile is to use a digital map in conjunction with the GPS system which provides an indication of vehicle position to within three meters. The signal from the GPS system can be used in conjunction with the digital map to generate a template profile. Various standard profiles could also be stored in memory 64 and a user could select an appropriate one such as, for example, concrete two-lane highway, asphalt two-lane highway, concrete four-lane highway, etc. The template stored in device 64 is updated as the vehicle is driven and can also be changed in the event of an abrupt change in road surface or road conditions as will be described hereinbelow in conjunction with FIGS. 15 and 16.

Returning to FIG. 10, the current scanline profile is received and shifted horizontally to the left and to the right by, for example, one centimeter intervals, at step 66. Thus, three additional scanline profiles are created by shifting the current scanline profile to the left by one centimeter, two centimeters, and three centimeters, respectively. An additional three scanline profiles are created by shifting the current scanline profile to the right by one centimeter, two centimeters, and three centimeters, respectively.

Figure 11:
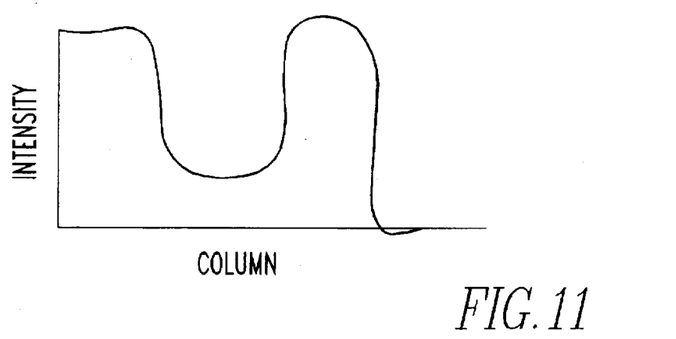
FIG. 11 illustrates a current scanline profile produced by the row having the highest score.
Figure 12:
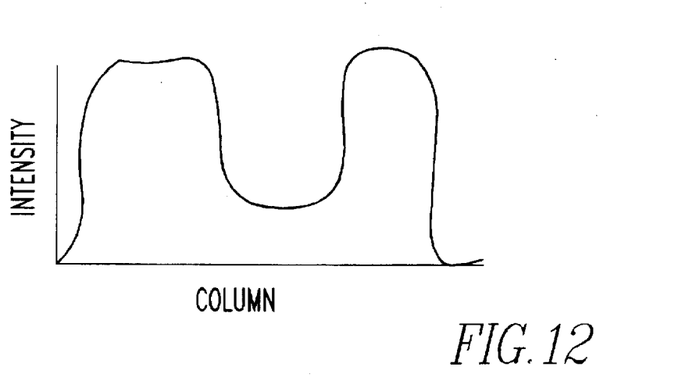
FIG. 12 illustrates a current template profile.
Figure 13:
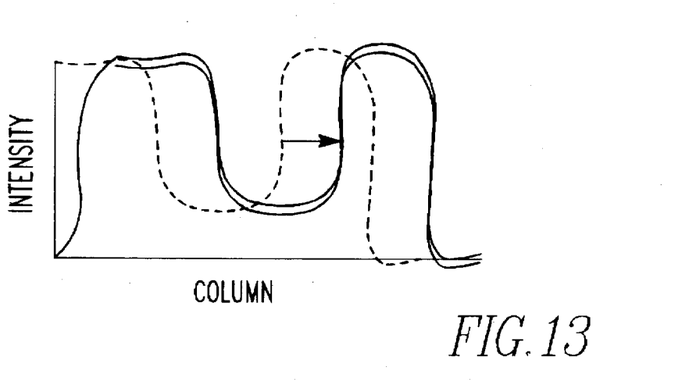
FIG. 13 illustrates the correlation between the profiles of FIGS. 11 and 12.

At step 68, the template profile is compared to the seven scanline profiles. A portion of that process is shown graphically in FIGS. 11-13. In FIG. 11, the current scanline profile is illustrated. In FIG. 12, the template profile is illustrated. FIG. 13 illustrates the lack of correlation between the two profiles. However, the scanline profile produced by shifting the current scanline profile to the right by two centimeters demonstrates a high degree of correlation with the template profile. Calculating the correlation between the two profiles is a well known mathematical operation, and results in the generation of a real number between −1 and +1, with +1 representing a perfect match between the two profiles.

At step 70, after all the scanline profiles are compared to the template profile, the scanline profile with the highest correlation value is selected. For example, if the scanline profile shifted two centimeters to the right produces the highest correlation with the template profile, then it is known that the current lateral offset of the vehicle from an ideal center position is two centimeters to the left.

At step 72, a decision is made to determine if the selected scanline profile is on the end. Step 72 of FIG. 10 is similar in purpose to step 54 in FIG. 6. That is, if the scanline profile having the highest correlation was shifted three centimeters, then additional scanline profiles are selected at step 74 to test scanline profiles shifted, for example, by four and five centimeters. From step 74, the process returns to step 68 and is repeated until the decision step 72 is satisfied. Thereafter, the lateral offset is output in block 75 from circuit 58 in FIG. 1 to circuit 60 in FIG. 1. The correlation is also output for purposes described hereinbelow.

The circuit 60 receives both the lateral offset, which is indicative of the degree by which the vehicle's position varies from an ideal center position, and also receives information regarding the curvature of the road. From those two pieces of information an appropriate output signal 76 can be produced depending upon the purpose of the system 12. The details of how the two aforementioned signals are combined to produce the output signal 76 are not described herein as the combination of those two signals does not form a feature of the present invention. The reader desiring more information about how the aforementioned signals can be combined to produce an output signal is referred to an article entitled "A Curvature-based Scheme For Improving Road Vehicle Guidance By Computer Vision" appearing in SPIE's Cambridge Symposium on Optical and Optoelectronic Engineering, Oct. 26–31, 1986, which is hereby incorporated by reference. It is sufficient to note that if the system 12 is designed to be a warning system, then the output signal 76 may result in an audible tone. Indeed, the present invention 12 may have its greatest potential in the short term as a lane departure warning system to alert a drowsy or inattentive driver that he is drifting out of his lane. That type of accident results in approximately 13,000 fatalities on U.S. highways every year. Drowsiness alone is a major factor in about 30% of all motor vehicle accidents, and is a particular problem in commercial vehicle operation.

The output signal 76 could also provide some tactile feedback to the driver, such as vibrating the steering wheel. In another embodiment of the system 12, the output signal 76 could be provided for the purpose of beginning to steer the vehicle in a direction to place it in the center of the road, or by making it more difficult to steer the vehicle in any direction other than a direction which would lead the vehicle back to the center of the road.

In the longer term, the system 12 has great potential as part of the automated highway system, a U.S. Department of Transportation sponsored project that its now in its infancy, but promises to revolutionize highway driving in the next century by fully automating much of the driving function on special lanes of the highway.

Figure 14:
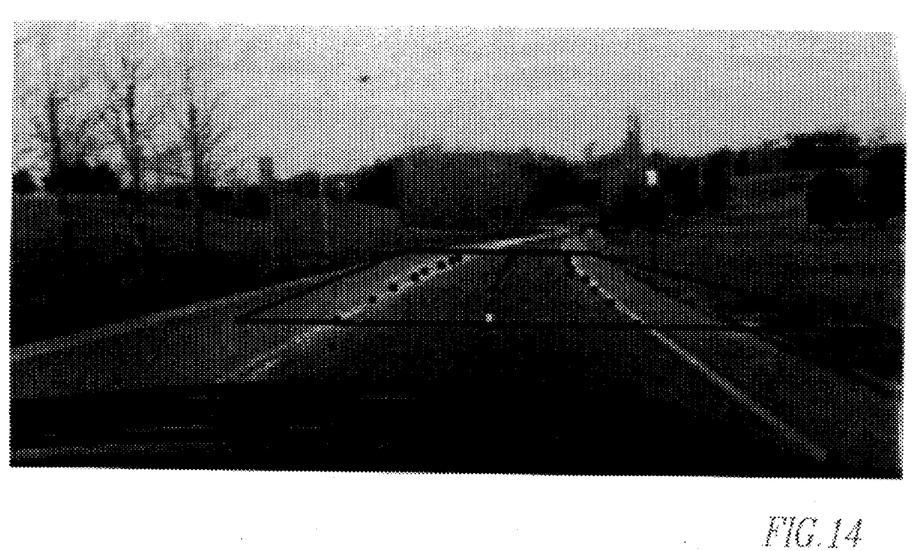
FIG. 14 illustrates a type of visual feedback which may be provided to a driver.

Another type of output signal may be produced in the event that the high resolution image 15 is made available to the driver. If the high resolution image 15 is made available to the driver, the system 12 may plot points on the image as shown in FIG. 14 corresponding to the features that it is tracking to illustrate what the system believes is the curvature of the road. The system could also plot on the image points representing the exact center of the road based on the features which it is tracking. Finally, the system 12 could plot on the image the current position and projected path of the vehicle based on the calculated lateral offset and curvature of the road. Thus, the driver could be provided with visual feedback indicating a course which is to be steered if the vehicle is to be maintained in the center of the road as calculated by the system 12.

Figure 15:
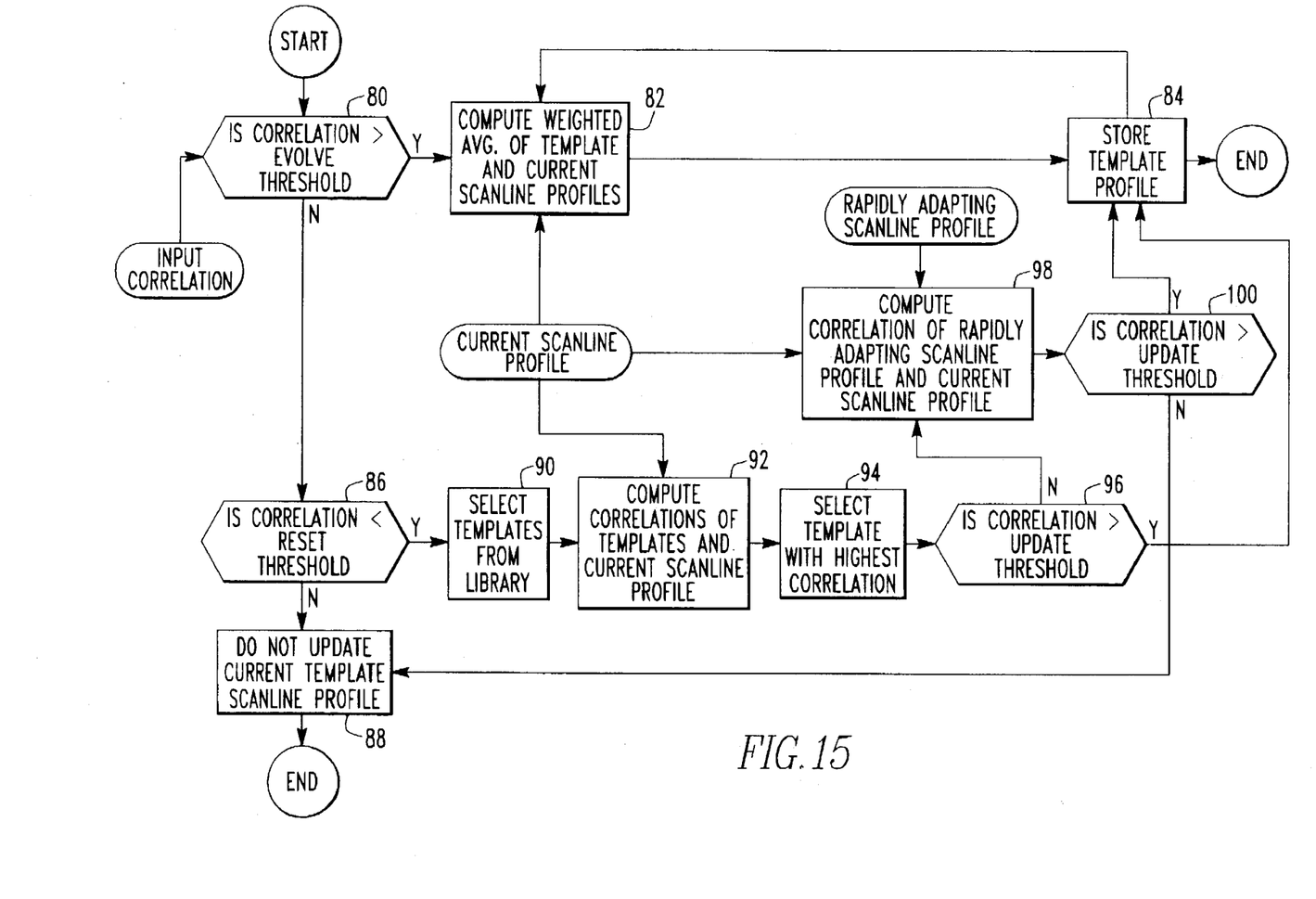
FIG. 15 is a flow chart illustrating how the template profile is updated and how it is changed.

To develop a robust system 12, the stored template profile must be capable of being updated and changed, if necessary, as indicated by a circuit 78 in FIG. 1. As before, in the preferred embodiment of the present invention, the circuit 78 is implemented with software. A flowchart of that software is illustrated in FIG. 15. In FIG. 15, the first step 80 is to check if the correlation between the current scanline profile and the current template profile is high enough to indicate that there is a good match. That is represented in decision step 70 in which the correlation value is compared with an "evolved threshold" value. If the correlation value is greater than the evolved threshold value, then there is a good match. The current template profile is retained and just slowly updated. Gradually updating the template profile is carried out by the "yes" branch from decision step 80.

Gradually updating the template profile is done by computing a weighted average of the current scanline profile and the current template profile at step 82. For each element in the updated template profile, the software adds 99% of the current value of the template profile with 1% of the current value of the current scanline profile. The result is stored as the updated template profile at step 84. Thus the template profile is gradually updated to resemble the current scanline profile.

Following the "no" branch of decision step 80 leads to a decision step 86 in which a comparison is made between the correlation value and a "reset threshold" value. If the correlation value is not below the reset threshold value, that means that the correlation is not sufficiently bad to justify trying to find a new, better, template profile. Under those circumstances, the scanline profile is not updated as indicated by the block 88. Thereafter, the template updating process ends.

If, at decision step 86, the correlation value is less than the reset threshold value, then the current template profile is a bad match, so the system searches for alternative templates that may match better. It first checks to see if there are any better matches in the library of stored templates. It selects one or more templates from the library at step 90, and computes the correlation at step 92 between those templates and the current scanline profile, using the method described above in FIG. 10. It then chooses the scanline profile with the highest correlation at step 94. If the highest correlation is greater than an "update threshold" value as shown in decision step 96, the match is a good one. The system replaces, at step 84, the current template profile with the best template profile found in the library.

If, at decision step 96, the best template profile found in the library was not a sufficiently good match, or if there is no library of stored templates, the system goes on to check at step 98 if a rapidly adapting scanline profile is a good match, again using the method described in FIG. 10. The rapidly adapting scanline profile is a profile generated in accordance with the flowchart illustrated in FIG. 16 which is described hereinbelow. The rapidly adapting scanline profile is a template profile generated using the top portion of the window of interest 17. If the correlation between the rapidly adapting scanline profile and the current scanline profile is greater than the update threshold value as shown by step 100, it is a good match and the current template profile is replaced with the rapidly adapting scanline profile as shown by step 84. If it is not a good match, the system gives up and does not attempt to update the current template profile on this iteration.

Figure 16:
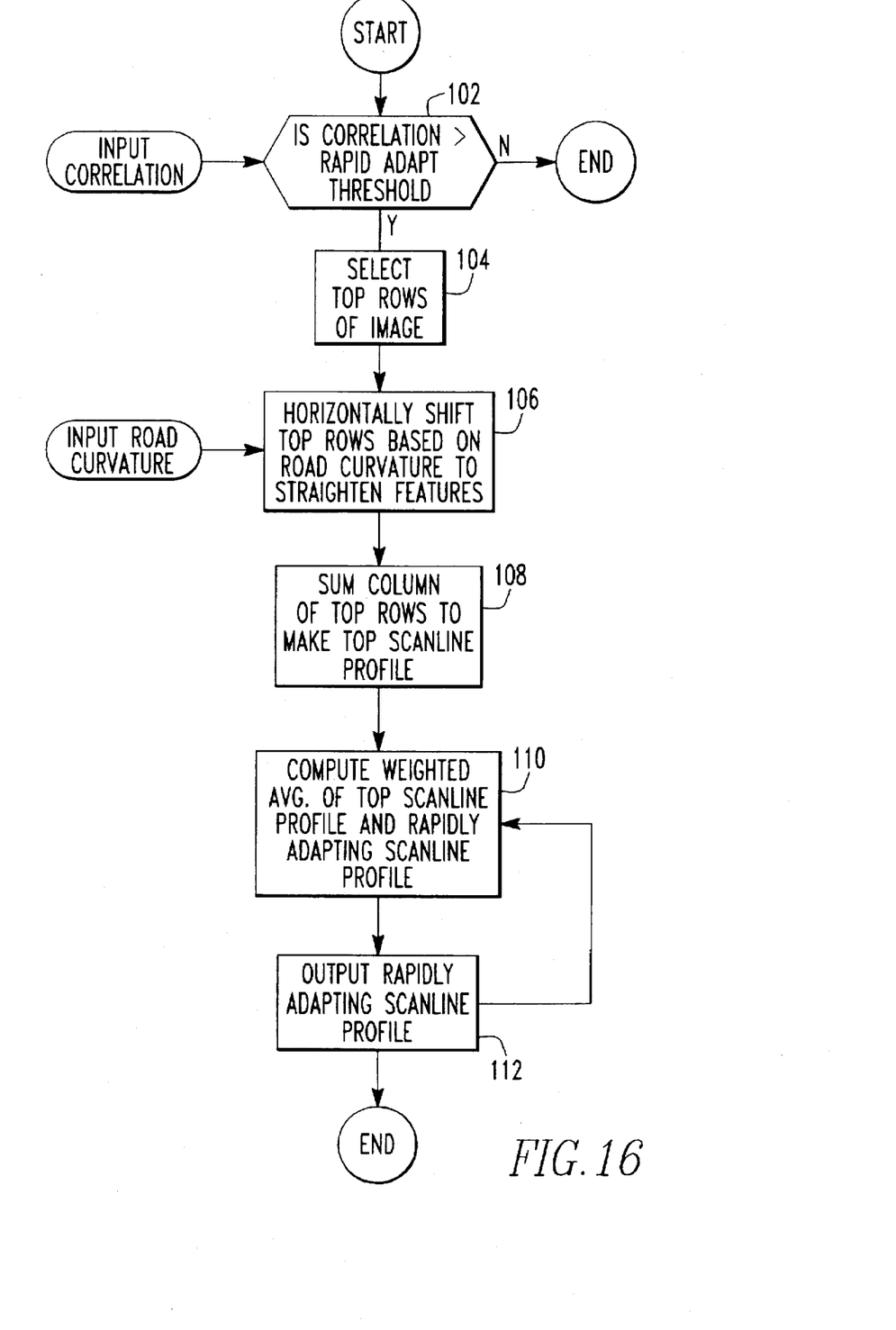
FIG. 16 is a flow chart illustrating how a rapidly adapting scanline profile is created and updated.

FIG. 16 is a flowchart illustrating how the rapidly adapting scanline profile is created. The steps of FIG. 16 may be carried out after performing the steps in the flowchart illustrated in FIG. 6 to determine the curvature of the road, after performing the steps of the flowchart in FIG. 10 to determine the lateral offset, and after performing the steps of the flowchart illustrated in FIG. 15 to update or change the template profile. The idea underlying the flowchart of FIG. 16 is to be constantly monitoring the road beyond the stretch of road directly ahead of the vehicle. That is, to be constantly monitoring the distal portion of the trapezoidal window of interest 17. In FIG. 16, the first decision step 102 determines whether the correlation between the current scanline profile and the current template profile is high enough to warrant updating the rapidly adapting template profile. To accurately generate and update the rapidly adapting template profile far ahead of the vehicle requires knowing the vehicle's current lateral position on the road. If the correlation is low, then the system 12 doesn't accurately know the current lateral position, and the process is ended. However, if the correlation is high, the next step 104 is to select some fraction of the rows at the top or distal portion of the image 17 which depict the road far ahead of the vehicle. For example, the top one-third of the image 17 could be selected. Then, using the road curvature obtained through the steps illustrated in FIG. 6, the rows at the top of the image are shifted horizontally to straighten the road features at step 106 in the same manner as shown in FIG. 5. The columns of the resulting straightened image are then summed vertically at step 108 to generate a top scanline profile.

The rapidly adapting scanline profile is then updated to more closely resemble the top scanline profile at step 110 using the same type of weighted average technique discussed in conjunction with step 82 in FIG. 15. However, in the case of step 110 in FIG. 16, the weight assigned to the top scanline profile in the weighted average is much higher than 1%. Typically, the weight may be 25%. That leads to the rapidly adapting scanline profile quickly changing to resemble the new road appearance after only a few iterations, so that by the time the vehicle reaches the part of the road with the new appearance, the rapidly adapting template is ready to be used. The steps involved in the decision whether to actually use the rapidly adapting template are steps 98 and 100 discussed hereinabove in conjunction with FIG. 15. In that manner, going from bright sunlight to dark shade will not confuse or disorient the system 12. Under such circumstances, the current template profile and the current scanline profile may have a high degree of correlation, but a rapidly adapting scanline profile is created for the stretch of road just ahead which is in dark shadow. When the vehicle actually reaches the dark shadow, the correlation between the current template profile and the current scanline profile drops off dramatically. However, by virtue of the process illustrated in FIG. 15, the system 12 recognizes that the rapidly adapting scanline profile now provides an excellent correlation with the current scanline profile. Thus, the system 12 in effect learns the road up ahead before the vehicle reaches it, so that when the vehicle does reach that portion of the road, a template for that portion of the road is already completed. In that manner, learning periods are essentially eliminated, or, more accurately, hidden behind current processing.

The present invention may be implemented in a wide variety of ways. For example, depending upon the available computing power, many of the steps disclosed in the flowcharts may be carried out in parallel to reduce overall processing time. In addition, the number of hypotheses and the like which are tested may also be a function of available computing power.

The present invention represents a substantial advance over the art in that it provides a system which is capable of tracking any available features in the road and is not dependent upon well marked lanes. The present invention is also capable of going from one road surface to another, one road condition to another, and the like, with very little, if any, learning time required to adapt to the new circumstances. Additionally, the present invention constantly updates the template profile used so that very slow changes in condition, like changes in lighting, do not confuse or disorient the system. Those of ordinary skill in the art will recognize that many modifications and variations of the present invention may be implemented without departing from the spirit and scope of the present invention. Accordingly, all such modification and variations are intended to be covered by the specification in the following claims.

What I claimed is:

1. A system for estimating lateral offset of a vehicle from a known position, comprising:

input means producing digitized input signals representative of the road ahead of the vehicle;

means for sampling said digitized input signals to create a perspective-free image, said perspective-free image taking the form of a matrix comprised of rows and columns;

means for determining the curvature of the road by determining an amount each row of said perspective-free image must be shifted to cause features to appear in said perspective-free image as straight lines, said means for determining including means for adding each column of said shifted perspective-free image to generate a current scanline profile representative of the vehicle's position on the road;

means for storing at least one template profile representative of a known vehicle position; and means for comparing said current scanline profile with said template profile to determine an amount by which said current scanline profile must be shifted to arrive at the best correlation with said template profile, said amount being representative of the lateral offset of the vehicle from the known vehicle position.

2. The system of claim 1 wherein said means for determining the curvature of the road includes:

means for generating a range of radii of curvature corresponding to hypothetical curvatures;

means for shifting said perspective-free image according to each of said radii, said means for adding each column of said shifted perspective-free images producing a row of values for each shifted perspective-free image; and means for selecting one of said rows of values for use as the current scanline profile.

3. The system of claim 2 wherein said means for selecting selects the shifted perspective-free image having the greatest number of vertically aligned features.

4. The system of claim 3 wherein said means for selecting selects the shifted perspective-free image having the greatest number of vertically aligned features by calculating the degree of abruptness of horizontal intensity value changes for each row of values and selecting the one of said rows that has the most abrupt variations.

5. The system of claim 4 wherein said means for selecting calculates the degree of abruptness by summing the differences in values between neighboring values in each of said rows of values to create a score for each row of values.

6. The system of claim 5 wherein said means for selecting selects the row of values having the highest score.

7. The system of claim 2 wherein said means for generating a range of radii of curvature generates additional radii of curvature if said selected current scanline profile results from a radius of curvature that is on either extreme of said range.

8. The system of claim 2 wherein said means for generating a range of radii of curvature generates said range based on a radius of curvature corresponding to a previous current scanline profile.

9. The system of claim 8 wherein said means for generating a range of radii of curvature generates a plurality of radii greater than and a plurality of radii less than the radius of curvature corresponding to the previous current scanline profile.

10. The system of claim 2 wherein said means for generating a range of radii of curvature generates positive radii representative of a right-hand curve, negative radii representative of a left-hand curve, and an infinite radius representative of no curvature.

11. The system of claim 2 wherein said means for generating a range of radii of curvature is responsive to the speed of the vehicle.

12. The system of claim 2 wherein said means for shifting shifts by one of integer pixel values and fractional pixel values.

13. The system of claim 12 wherein said means for shifting shifts by fractional pixel values by linearly interpolating between integer pixel values using weighted averages of the values of said integer pixel values.

14. The system of claim 1 wherein said means for comparing said current scanline profile with said template profile includes:

means for creating a plurality of shifted copies of said current scanline profile;

means for calculating a correlation between each of said shifted copies and said template profile; and means for selecting the one of said shifted copies with the highest correlation, the amount of shift associated therewith being representative of the lateral offset of the vehicle.

15. The system of claim 14 wherein said means for creating a plurality of shifted copies creates a range of copies wherein certain of said copies are shifted to the right and certain of said copies are shifted to the left of the current scanline profile.

16. The system of claim 15 wherein said means for creating a plurality of shifted copies creates additional shifted copies when said selected shifted copy is on either extreme of said range.

17. The system of claim 1 wherein said means for sampling identifies a window of interest within the image represented by said digitized input signals, said window of interest representing a perspective view of the road ahead.

18. The system of claim 17 wherein said means for sampling identifies a trapezoidally-shaped window of interest, the parallel sides of said trapezoidally-shaped window of interest being parallel to the top and bottom of said image with the top edge being shorter than the bottom edge.

19. The system of claim 18 wherein said means for sampling is responsive to the speed of said vehicle.

20. The system of claim 17 wherein said means for sampling segments said window of interest into said matrix of rows and columns, said matrix representing a perspective-free image translation of said window of interest, and wherein each row of said matrix represents a region of said window of interest of constant height and variable width.

21. The system of claim 1 additionally comprising means for evolving said template profile, said means for evolving including:

means for combining said current scanline profile and said template profile according to a predetermined function to form an updated template profile; and means for replacing said template profile with said updated template profile.

22. The system of claim 21 wherein said predetermined function includes a combination of the weighted averages of said current scanline profile and said template profile.

23. The system of claim 21 wherein said means for comparing includes means for calculating a correlation between said current scanline profile and said template profile, said system additionally comprising means for comparing said correlation to an evolve threshold, and wherein said means for combining is responsive to said means for comparing.

24. The system of claim 23 wherein said means for replacing said template profile includes:

means for comparing said correlation to a reset threshold;

means for determining a second correlation between said current scanline profile and said updated template profile in response to said means for comparing;

means for comparing said second correlation to an update threshold; and means for replacing said template profile with said updated template profile in response to said means for comparing to said update threshold.

25. The system of claim 1 additionally comprising means for creating a rapidly adapting scanline profile, said means for creating including:

means for selecting a predetermined number of rows from the top of said perspective-free image;

means for shifting said rows in response to said means for determining the curvature of the road;

means for adding each column of said shifted rows to generate a top scanline profile;

means for combining an instance of said rapidly adapting scanline profile and said top scanline profile according to a predetermined function to form a new instance of said rapidly adapting scanline profile; and means for replacing said template profile with said rapidly adapting scanline profile.

26. The system of claim 1 wherein said means for storing stores a library of alternate template profiles, each of said alternate template profiles being representative of a known vehicle position, said system additionally comprising means for changing the template profile.

27. The system of claim 26 wherein said means for comparing includes means for calculating a correlation between said current scanline profile and said template profile, and wherein said means for changing said template profile includes:

means for comparing said correlation to a reset threshold;

means for determining additional correlations between said current scanline profile and said alternate template profiles in response to said means for comparing;

means for selecting the highest additional correlation;

means for comparing said highest additional correlation to an update threshold; and means for replacing said template profile with said alternate template profile corresponding to said highest additional correlation in response to said means for comparing to said update threshold.

28. The system of claim 1 additionally comprising output means for producing vehicle control signals in response to said means for determining the curvature of the road and the lateral offset.

29. The system of claim 1 additionally comprising output means for producing warning signals in response to said means for determining the curvature of the road and the lateral offset.

30. A system for estimating lateral offset of a vehicle from a known position, comprising:

input means producing digitized input signals representative of the road ahead of the vehicle;

means for sampling said digitized input signals to create a perspective-free image, said perspective-free image taking the form of a matrix comprised of rows and columns;

means for determining the curvature of the road by determining an amount each row of said perspective-free image must be shifted to cause features to appear in said perspective-free image as straight lines, said means for determining including means for adding each column of said perspective-free image to generate a current scanline profile representative of the vehicle's position on the road;

means for storing a plurality of template profiles representative of known vehicle positions;

means for selecting one of said stored template profiles; and means for comparing said current scanline profile with said selected template profile to determine an amount by which said current scanline profile must be shifted to arrive at the best correlation with said selected template profile, said amount being representative of the lateral offset of the vehicle and the known vehicle position.

31. A method for estimating lateral offset of a vehicle from a known position, said method comprising the steps of:

producing digitized input signals representative of the road ahead of the vehicle;

sampling said digitized input signals to create a perspective-free image, said perspective-free image taking the form of a matrix comprised of rows and columns;

determining the curvature of the road by determining an amount each row of said perspective-free image must be shifted to cause features to appear in said perspective-free image as straight lines, said step of determining including the step of adding each column of said shifted perspective-free image to generate a current scanline profile representative of the vehicle's position on the road;

storing a template profile representative of a known vehicle position; and comparing said current scanline profile with said template profile to determine an amount by which said current scanline profile must be shifted to arrive at the best correlation with said template profile, said amount being representative of the lateral offset of the vehicle from the known vehicle position.

* * * * *